(12) United States Patent
Kasajima et al.

(10) Patent No.: US 6,747,848 B2
(45) Date of Patent: Jun. 8, 2004

(54) HEAD GIMBAL ASSEMBLY WITH PRECISE POSITIONING ACTUATOR FOR HEAD ELEMENT

(75) Inventors: Tamon Kasajima, Kwai Chung (HK); Masashi Shiraishi, Kwai Chung (HK)

(73) Assignee: SAE Magnetics (H.K.) Ltd., Kwai Chung (HK)

( * ) Notice: Subject to any disclaimer, the term of this patent is extended or adjusted under 35 U.S.C. 154(b) by 140 days.

(21) Appl. No.: 10/125,341

(22) Filed: Apr. 19, 2002

(65) Prior Publication Data

US 2002/0154446 A1 Oct. 24, 2002

(30) Foreign Application Priority Data

Apr. 23, 2001 (JP) ........................................ 2001-124241

(51) Int. Cl.⁷ ................................................ G11B 5/56
(52) U.S. Cl. .................................. 360/245.3; 360/294.4
(58) Field of Search ......................... 360/245.3, 294.3, 360/294.4, 294.6, 245.5

(56) References Cited

U.S. PATENT DOCUMENTS

| | | | | |
|---|---|---|---|---|
| 5,856,896 A | * | 1/1999 | Berg et al. ............... | 360/245.3 |
| 6,069,771 A | * | 5/2000 | Boutaghou et al. ....... | 360/294.4 |
| 6,078,473 A | * | 6/2000 | Crane et al. ............. | 360/294.3 |
| 6,297,936 B1 | * | 10/2001 | Kant et al. ............... | 360/294.4 |
| 6,359,757 B1 | * | 3/2002 | Mallary .................... | 360/294.3 |
| 6,381,104 B1 | * | 4/2002 | Soeno et al. ............. | 360/294.4 |
| 6,493,192 B2 | * | 12/2002 | Crane et al. ............. | 360/294.3 |
| 6,515,835 B2 | * | 2/2003 | Ezaki et al. ............. | 360/294.4 |
| 6,549,375 B1 | * | 4/2003 | Crane et al. ............. | 360/245.3 |
| 6,618,220 B2 | * | 9/2003 | Inagaki et al. ........... | 360/78.05 |
| 6,633,458 B2 | * | 10/2003 | Wu et al. ................. | 360/294.4 |
| 2001/0021086 A1 | * | 9/2001 | Kuwajima et al. ........ | 360/294.4 |
| 2002/0141117 A1 | * | 10/2002 | Kasajima et al. ........ | 360/294.4 |
| 2002/0176212 A1 | * | 11/2002 | Ota et al. ................ | 360/294.4 |

* cited by examiner

*Primary Examiner*—Jefferson Evans
(74) *Attorney, Agent, or Firm*—Burns, Doane, Swecker & Mathis, L.L.P.

(57) ABSTRACT

An HGA includes a head slider provided with at least one head element, a load beam, a flexure fixed to the load beam for determining a flying attitude of the head slider, a precise positioning actuator fixed to the head slider and supported by the flexure, for precisely positioning the at least one head element, and a load adjustment mechanism formed with the actuator, for adjusting a load imposed on the head slider.

21 Claims, 8 Drawing Sheets

US 6,747,848 B2

HEAD GIMBAL ASSEMBLY WITH PRECISE POSITIONING ACTUATOR FOR HEAD ELEMENT

FIELD OF THE INVENTION

The present invention relates to a head gimbal assembly (HGA) with a precise positioning actuator for a head element such as a thin-film magnetic head element or an optical head element.

DESCRIPTION OF THE RELATED ART

In a magnetic disk drive apparatus, thin-film magnetic head elements for writing magnetic information into and/or reading magnetic information from magnetic disks are in general formed on magnetic head sliders flying in operation above the rotating magnetic disks. The sliders are supported at top end sections of suspensions of HGAs, respectively.

Recently, recording and reproducing density along the radial direction or along the track width direction in the magnetic disk (track density) has rapidly increased to satisfy the requirement for ever increasing data storage capacities and densities in today's magnetic disk drive apparatus. For advancing the track density, the position control of the magnetic head element with respect to the track in the magnetic disk by only a voice coil motor (VCM) has never presented enough accuracy.

In order to solve this problem, an additional actuator mechanism is mounted at a position nearer to the magnetic head slider than the VCM so as to perform fine precise positioning that cannot be realized by the VCM only. The techniques for realizing precise positioning of the magnetic head are described in for example U.S. Pat. No. 5,745,319 and Japanese patent publication No. 08180623 A.

The HGA with such a precise positioning actuator is required to have a sufficient high resonance frequency of the suspension to provide a high speed servo-operation.

In general, a load applied to the magnetic head slider is adjusted by means of a bending section additionally formed as a part of a load beam of a suspension near a base plate. Namely, the load beam at a position near the base plate is slightly bent to form the bending section so that a top end section of the load beam presses the magnetic head slider mounted toward a magnetic disk. The load applied to the magnetic head slider can be adjusted by controlling a bend angle of this bending section.

However, forming of such a bending section onto the load beam greatly lowers a resonance frequency of the whole suspension due to a complex shape of the bent load beam. Thus, the lowered resonance frequency may be laid within a frequency band used for the servo mechanism making a high speed operation of the servo difficult.

Also, if such a bending section is formed onto the load beam, the suspension will be seriously susceptible to wind resistance. Namely, side winds produced due to a high-speed rotation of the magnetic disk will be directly applied to and thus exert a large influence upon the bending section causing random vibrations of the suspension to occur. Particularly, the influence of the wind resistance becomes large in case of a recent high end HDD in which the magnetic disk rotates at a high speed of 10,000 to 15,000 rpm or more.

Furthermore, since the bending section has a low stiffness, a top end section of the suspension will receive a large impact if a shock toward its up-and-down directions (Z-directions) is applied to the suspension causing making a shock resistance of the whole suspension extremely poor.

In addition, according to the conventional HGA with a bending section for adjusting a load applied to the magnetic head slider by controlling its bent bend angle, not only the fabrication process is complicated but also a precise adjustment of the load cannot be expected. Particularly, because the load value to be adjusted decreases as the magnetic head slider becomes light in weight, any variation in the adjusted load cannot be negligible and therefore load tolerance increases.

SUMMARY OF THE INVENTION

It is therefore an object of the present invention to provide an HGA with a precise positioning actuator for a head element, whereby a resonance frequency of the HGA can be increased.

Another object of the present invention is to provide an HGA with a precise positioning actuator for a head element, whereby wind-resistance performance of the HGA can be increased.

Further object of the present invention is to provide an HGA with a precise positioning actuator for a head element, whereby a resistance against a shock of in Z-directions can be increased.

Still further object of the present invention is to provide an HGA with a precise positioning actuator for a head element, whereby a manufacturing process of the HGA can be simplified and a load tolerance can be kept small.

According to the present invention, an HGA includes a head slider provided with at least one head element, a load beam, a flexure fixed to the load beam for determining a flying attitude of the head slider, a precise positioning actuator fixed to the head slider and supported by the flexure, for precisely positioning the at least one head element, and a load adjustment mechanism formed with the actuator, for adjusting a load imposed on the head slider.

The actuator is provided with a load adjustment mechanism for adjusting a load imposed on the head slider. Therefore, it is unnecessary that the load beam of the HGA has a bending section for imposing a load, and thus the load beam can be formed by a member with a sufficient stiffness resulting in increasing a resonance frequency of the suspension. Accordingly, a frequency band for a servo can be broadened and thus a high speed seek operation of the servo can be expected. The increased stiffness of the suspension provides improvement in a shock resistance of the HGA against a Z-direction impact.

Also, since the load beam which has a large side sectional area and receives side winds with no bending section for imposing a load, influence of wind resistance can be suppressed to a minimum. Furthermore, since the imposed load is adjusted by controlling the load adjustment mechanism instead of controlling a bending angle of a bending section, not only a manufacturing process of the HGA can be simplified and a manufacturing cost of the HGA can be reduced, but also the imposed load can be adjusted with a high accuracy and a small tolerance.

It is preferred that the load adjustment mechanism is formed directly underneath a load point onto the head slider.

It is also preferred that a projection or a dimple formed on the load beam functions as the load point.

It is preferred that the load adjusting means includes a spring plate section for controlling the load imposed on the head slider, and that one end of the load adjusting means is a free end.

It is further preferred that the actuator is formed from a multilayer plate member. In this case, it is more preferred that the multilayer plate member includes a first thin metal plate layer, a resin layer laminated on the first thin metal plate layer and a second thin metal plate layer laminated on the resin layer, and that the spring plate section is formed by a part of the first or second thin metal plate layer.

It is also preferred that the actuator is formed from a single-layer metal plate member. In this case, it is more preferred that the load adjustment mechanism includes the single-layer metal plate member and a spacer laminated on the single-layer metal plate member, and that the spring plate section is formed by a part of the single-layer metal plate member.

It is further preferred that the actuator is unitarily formed with the flexure, or individually formed from the flexure.

Preferably, the load beam is a straight shaped load beam to have a high stiffness. In this case, the load beam may consist of a single plate member. The load beam may have no load adjustment mechanism for adjusting a load imposed on the head slider.

It is also preferred that the HGA further includes a back-bending section capable of bending a part of the HGA at the time of mounting of the HGA to an HDD.

It is preferred that the actuator includes a pair of movable arms each formed by a multilayer plate member or a single-layer metal plate member that is substantially in parallel with a side surface of the head slider, top end sections of the pair of movable arms being capable of displacing in response to a drive signal applied to the actuator along directions crossing a plane of the multilayer plate member or the single-layer metal plate member, and a coupling section connected between the top end sections of the pair of movable arms and formed by a multilayer plate member or a single-layer metal plate member that is substantially in parallel with a one surface of the head slider, the one surface being opposite to an air bearing surface (ABS) of the head slider, and that the one surface of the head slider is fixed to the coupling section.

Since the actuator is provided with the coupling section connected between the top end sections of the pair of movable arms and the head slider is to be fixed to this coupling section, fixing of the slider can be achieved with sufficient strength and a shock resistance against up-and-down movements can be greatly improved. Also, head sliders with different widths can be easily mounted to the actuator.

Further, the movable arms and the coupling section are mainly made from the multilayer plate member or the single-layer metal plate member, the weight of the whole actuator can be reduced and thus a mechanical resonance frequency of the actuator can be increased. Also, as a basic member of the arms is formed by the multilayer plate member or the single-layer metal plate member that is strong and light-weighted, a shock resistance of the movable arms that are particularly weaken for the shock can be greatly improved. Due to the usage of the multilayer plate member or the single-layer metal plate member provided with a high mechanical strength, treatment of the actuator during assembling of the HGA becomes very easy. By using the multilayer plate member or the single-layer metal plate member to form the main portion of the actuator, the flexibility on a design of the actuator will improve with the shape and/or size. Thus, it is enabled to design the actuator with a sufficient stroke. Furthermore, because the multilayer plate member or the single-layer metal plate member can be precisely machined, accuracy in size of the actuator itself can be greatly improved.

Also, since the head slider is mounted in a space between the movable arms, the thickness of the HGA (Z-height) around the head slider does not increase even if the actuator is attached. Thus, no modifications in size of the disk drive apparatus due to the mounting of the actuator is necessary. In addition, since the head slider is caught in between the movable arms, the top end sections of the movable arms, which actually transfer the displacement to the slider, can be extended to always position at the top end of the slider. Thus, it is possible to provide a constant travel to the slider even if the size of the head slider changes, and therefore an enough stroke of the head at the precise positioning operation can be always obtained.

Because of a partial fixing of the head slider to the coupling section of the actuator, shape change in the ABS of the head slider (generation of crown or camber) can be prevented from occurring even if the adhesive deforms due to change in atmosphere temperature.

It is also preferred that the actuator further includes a base section formed by a multilayer plate member or a single-layer metal plate member that is in parallel with the coupling section, wherein the base section is fixed to or united with the flexure, and that the pair of movable arms extend forward from the base section. As not only the movable arms and the coupling section but also the base section are made from the multilayer plate member or the single-layer metal plate member, the weight can be more reduced and a shock resistance can be more improved. Also, accuracy in size of the actuator itself can be greatly improved.

It is further preferred that the pair of movable arms, the coupling section and the base section of the actuator have a U-shaped section structure formed by bending a multilayer plate member or a single-layer metal plate member. Since the main portion of the actuator is configured by bending the multilayer plate member or the single-layer metal plate member, its fabrication becomes easy and a mechanically strong actuator can be provided.

It is preferred that each of the pair of movable arms of the actuator includes an arm member formed by a multilayer plate member or a single-layer metal plate member, and a piezoelectric element formed or adhered on a side surface of the arm member. In this case, the piezoelectric element may have a multilayer structure of piezoelectric material layers and of electrode layers, or a single-layer structure of a piezoelectric material layer and of an electrode layer. If the piezoelectric element is formed in the multi-layered structure, sufficient displacement will be obtained at low drive voltage and a horizontal shock resistance will be increased.

It is also preferred that the coupling section of the actuator is fixed to the head slider by an adhesive.

It is preferred that the at least one head element is at least one thin-film magnetic head element.

Further objects and advantages of the present invention will be apparent from the following description of the preferred embodiments of the invention as illustrated in the accompanying drawings.

DESCRIPTION OF THE PREFERRED EMBODIMENT

Figure 1:
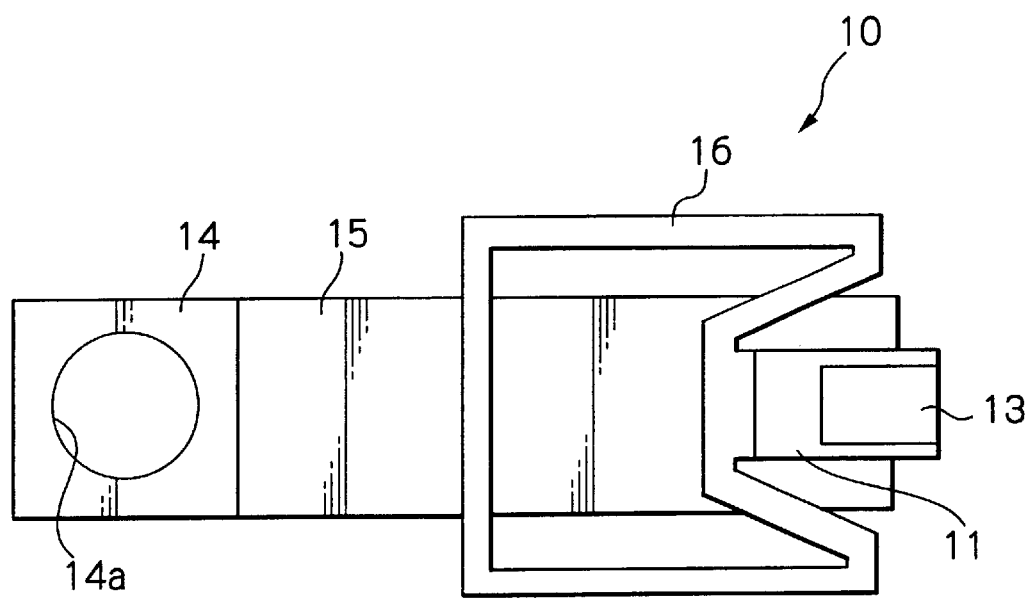
FIG. 1 is a plane view schematically illustrating the whole structure of an HGA in a preferred embodiment according to the present invention.
Figure 2:
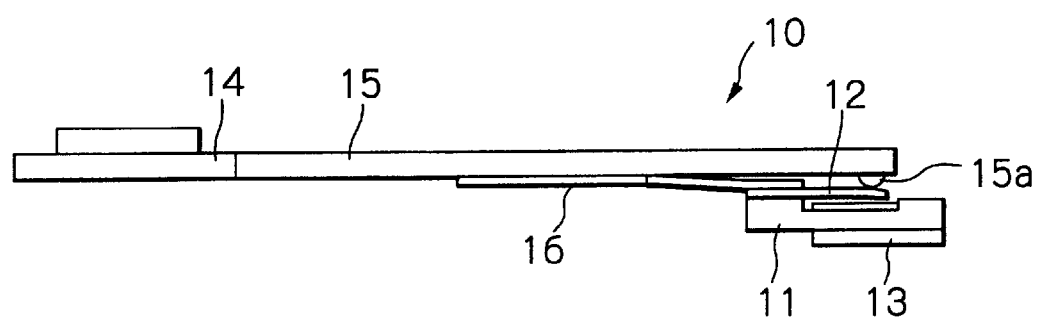
FIG. 2 is a side view of the HGA, in the embodiment of FIG. 1.
Figure 3:
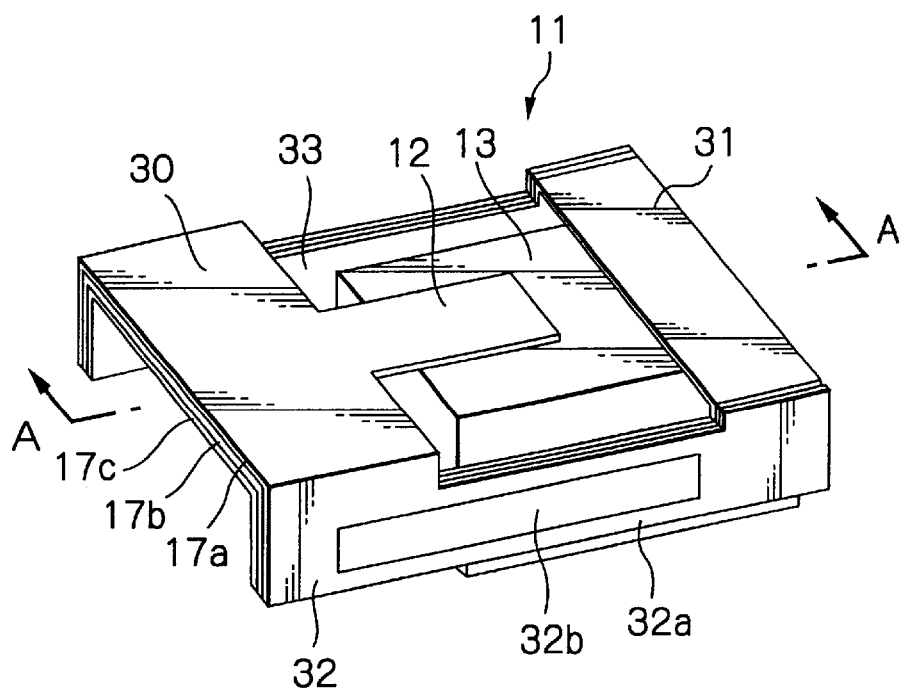
FIG. 3 is an oblique view illustrating an actuator of the HGA in the embodiment of FIG. 1.
Figure 4:
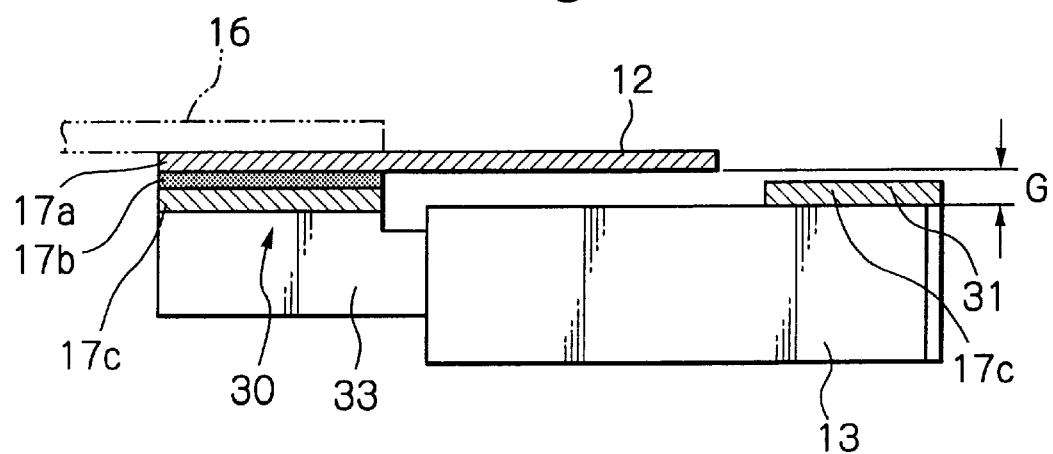
FIG. 4 is an A—A line sectional view of FIG. 3.
Figure 5:
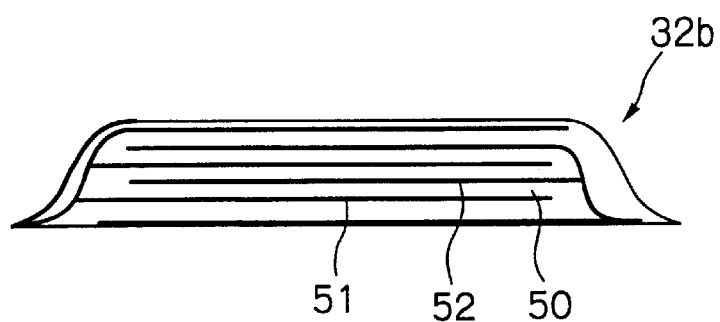
FIG. 5 is a sectional view illustrating a structure of a piezoelectric element section of the actuator in the embodiment of FIG. 1.
Figure 6:
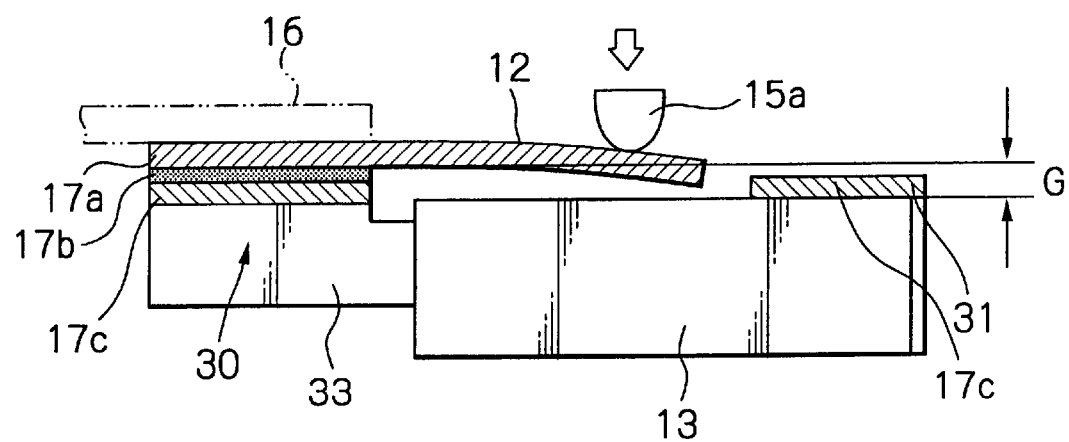
FIG. 6 is an A—A line sectional view of FIG. 3, illustrating operations of the actuator in the embodiment of FIG. 1.

FIG. 1 schematically illustrates the whole structure of an HGA, in a preferred embodiment according to the present invention, FIG. 2 is a side view of the HGA shown in FIG. 1, FIG. 3 illustrates an actuator of the HGA shown in FIG. 1, FIG. 4 is an A—A line sectional view of FIG. 3, FIG. 5 illustrates a structure of a piezoelectric element section of the actuator shown in FIG. 1, and FIG. 6 is an A—A line sectional view of FIG. 3 for illustrating operations of the actuator shown in FIG. 1.

In this embodiment, an actuator provided with a load adjustment mechanism is fabricated independently on a flexure and then fixe to the flexure.

As shown in FIGS. 1 and 2, the HGA is substantially configured by fixing a fine tracking actuator 11 for precise positioning of a thin-film magnetic head element, provided with a load adjustment mechanism 12, to a top end section of a suspension 10. A surface that is opposite to an air bearing surface (ABS) of a magnetic head slider 13 provided with the thin-film magnetic head element is fixed to the actuator 11. The HGA also has an electrical conductor member consisting of trace conductors (not shown) connected to the magnetic head element and to the actuator.

The suspension 10 includes a base plate 14, a load beam 15 coupled to the base plate 14 and formed by a metal plate member, and a flexure (or gimbal) 16 fixed to and supported by the load beam 15. The actuator 11 is fixed to a top end section of the flexure 16.

The base plate 14 is made of in this embodiment a metal plate 11 member such as for example a stainless steel plate with a relatively large thickness. At a rear end section of the base plate, an attaching hole 14a used for attaching the HGA to a drive arm (not shown) of the HDD.

The load beam 15 is made of in this embodiment a single plane metal plate member such as for example a stainless steel plate with a relatively large thickness and has no bending section. Thus, the load beam 15 is configured by only a high stiffness member. The load beam 15 and the base plate 14 may be fabricated as a single unitary component instead of fabricating as independent components. The fixing of the load beam 15 with the base plate 14 and the fixing of the load beam 15 with the flexure 16 are performed by pinpoint welding at a plurality of points. A projection or dimple 15a that is a load point is formed at a top end section of the load bean 15.

The flexure 16 has an appropriate stiffness for controlling the attitude of the magnetic head slider 13 through the actuator 11 in operation. The flexure 16 in this embodiment is formed by processing a single thin metal plate such as a stainless steel plate in a plane M-shape as shown in FIG. 1. If the flexure 16 and the actuator 11 are independently fabricated and then a rear end section or a base section of the actuator 11 is fixed to the top end section of the flexure 16, a floating attitude of the magnetic head slider may be unstable because a point for supporting the actuator 11 does not locate at lateral side nor at top end side of the load point, namely the dimple 15a. However, in this embodiment, since the flexure 16 is formed in the M-shape as shown in FIG. 1, the support point will locate at the lateral side or at the top end side of the dimple 15a.

As shown in FIG. 3, the main portion (frame) of the actuator 11 with the load adjustment mechanism 12 in this embodiment is formed by sequentially laminating a first stainless steel thin plate 17a, a resin layer 17b made of a polyimide resin for example and a second stainless steel thin plate 17c to form a three-layered plate member, by etching the three-layered plate member in a predetermined layer or layers and into a predetermined shape, and by bending the etched plate member into a three dimensional shape. Namely, each actuator member etched into the separated predetermined shape is substantially perpendicularly bent along lines inside from the both side edges of a strip-shaped base section 30, upper surface in FIGS. 3 and 4, of which will be fixed to the flexure 16, and of a strip-shaped coupling section 31, lower surface in FIGS. 3 and 4, of which will be fixed to the magnetic head slider 13. Thus, a pair of movable arms 32 and 33 of the actuator run in parallel with each other keeping substantially perpendicular to the base section 30 and the coupling section 31. Since the actuator is formed by bending at inside positions from the side end edges of the coupling section 31, each of the movable arms 32 and 33 is shaped in a strip-shaped plane plate. In order to obtain large stroke in response to a lower driving force, it is very important that the whole of each movable arm is formed in a plane plate shape.

In this embodiment, the movable arms 32 and 33 are formed in parallel to side surfaces of the magnetic head slider 13, and the base section 30 and the coupling section 31 are formed in parallel to a surface which is opposite to the ABS of the magnetic head slider 13.

The base section 30 has a shape such that a rectangular plate spring section is protruded frontward from the strip. This plate spring section configures the load adjustment mechanism 12.

The movable arm 32 consists of an arm member 32a, a piezoelectric element 32b formed on an outside surface of the arm member 32a, a signal terminal (not shown) of the piezoelectric element 32b and a ground terminal (not shown) of the piezoelectric element 32b. The movable arm 33 is configured similarly.

In this embodiment, the piezoelectric elements, the signal terminals and the ground terminals are formed on the outside surfaces of the arm members. However, it is possible to form the piezoelectric elements, the signal terminals and the ground terminals on the inside surfaces of the arm members. The latter is preferable because a region for catching the actuator by a jig will increase.

The base section 30 and the pair of the arm members are formed by the three-layered plate member consisting of the first stainless steel thin plate 17a, the resin layer 17b and the second stainless steel thin plate 17c. The load adjustment mechanism 12 is formed by only the first stainless steel thin plate 17a. The coupling section 31 is formed by only the second stainless steel thin plate 17c.

Each of the piezoelectric elements has, as shown in FIG. 5, a multi-layered structure of alternately laminating piezoelectric material layers 50, signal electrode layers 51 and ground (common) electrode layers 52. By applying voltage across the signal electrode layers 51 and the ground (common) layers 52, the piezoelectric material layers 50 expand and contract. The piezoelectric material layer 50 is made of material that expands and contracts by reverse piezoelectric effect or by electrostrictive effect. The signal electrode layers 51 are electrically connected to B channel and A channel signal terminals, and the ground electrode layers 52 are electrically connected to the ground terminals.

In case that the layers 50 are made of piezoelectric material such as PZT (Lead Zirconate Titanate Oxidization), these piezoelectric material layers are in general polarized so as to improve their displacement performance. The polarized direction is the lamination direction of the piezoelectric material layers 50. When voltage is applied across the electrode layers and the direction of the produced electrical field is the same as the polarized direction, the piezoelectric material layer between the electrode layers expands in its lamination direction (piezoelectric longitudinal effect) and contracts in its in-plane direction (piezoelectric lateral effect). Contrary to this, when the direction of the produced electrical field is in inverse as the polarized direction, the piezoelectric material layer between the electrode layers contracts in its lamination direction (piezoelectric longitudinal effect) and expands in its in-plane direction (piezoelectric lateral effect).

If the voltage with a polarity which will induce the contraction or expansion is applied to the piezoelectric element, the piezoelectric element contracts or expands in response to the applied voltage polarity and thus each of the movable arms 32 and 33 bends to trace a S-character resulting in laterally and linearly displacing the top end section of the arm 32 or 33. Thus, the magnetic head slider 13 fixed to the actuator 11 also laterally and linearly displaces. Since the slider displaces namely oscillates with linear motion not swinging or rotational motion, more precise positioning of the magnetic head element can be expected.

It is possible to apply voltages that induce mutually reverse motions may be simultaneously applied to the piezoelectric elements, respectively. In other words, AC voltages may be simultaneously applied to the piezoelectric elements so that one piezoelectric element expands when the other piezoelectric element contracts and vice versa. The oscillation of the movable arms is centered when no voltage is applied to the piezoelectric elements. However, one of the piezoelectric elements is expanded and therefore the direction of the driving voltage opposes to that of the polarization in the piezoelectric material layer. Thus, if the applied voltage is high or the voltage is continuously applied, attenuation in polarization of the piezoelectric material layer may occur. It is desired therefore that a constant DC bias voltage in the same direction as the polarization direction be additionally applied to the AC voltage to form the driving voltage so that the direction of the driving voltage never opposes to that of the polarization in the piezoelectric material layer. The oscillation of the movable arms is centered when only the bias voltage is applied to the piezoelectric elements.

In this specification, the piezoelectric material is material that expands or contracts by their reverse piezoelectric effect or electrostrictive effect. Any piezoelectric material applicable for the piezoelectric elements of the actuator can be used. However, for high stiffness, it is desired to use a ceramics piezoelectric material such as $PZT[Pb(Zr,Ti)O_3]$, $PT(PbTiO_3)$, $PLZT[(Pb,La)(Zr,Ti)O_3]$, or barium titanate $(BaTiO_3)$.

Each of the piezoelectric elements may have a single layer structure of alternately laminating a piezoelectric material layer, a signal electrode layer and a ground (common) electrode layer.

The actuator 11 in this embodiment holds the magnetic head slider 13 by adhering its coupling section 31 to the surface opposite to the ABS of the slider 13 using a resin adhesive for example. Since the magnetic head slider 13 is fixed to the coupling section 31, fixing of the slider can be achieved with sufficient strength and a shock resistance against up-and-down movements can be greatly improved. Also, magnetic head sliders with different widths can be easily mounted to the actuator.

Because of a partial fixing of the magnetic head slider 13 to the coupling section 31 of the actuator 11, shape change in the ABS of the magnetic head slider 13 (generation of crown or camber) can be prevented from occurring even if the adhesive deforms due to change in atmosphere temperature. The fixing strength can be increased if the adhesive is also applied to the side surfaces of the magnetic head slider 13. In case of using a conductive adhesive, the body of the magnetic head slider 13 can be easily grounded through the actuator 11.

The base section 30 of the actuator 11 is adhered to the top end section of the flexure 16 by an adhesive.

The height of the actuator 11 should be determined to be equal to or less than that of the magnetic head slider 13 so that the total height of the HGA will not increase even if the actuator is assembled in the HGA. In other words, the height of the actuator 11 can be increased to that of the magnetic head slider 13 so as to improve the strength of the actuator itself without increasing the total HGA height.

As aforementioned, since the base section 30, the coupling section 31, main portions of the movable arms 32 and 33 and also the load adjustment mechanism 12 of the actuator 11 in this embodiment are made from a three-layered plate member, the weight of the whole actuator can be reduced and thus a mechanical resonance frequency of the actuator can be increased. Also, as the basic member is formed by the three-layered plate member that is strong and light-weighted, a shock resistance of the movable arms 32 and 33 which are particularly weaken for the shock can be greatly improved.

Due to the usage of the three-layered plate member provided with a high mechanical strength, treatment of the actuator during assembling of the HGA becomes very easy. By using the three-layered plate member to form the main portion of the actuator, the flexibility on a design of the actuator will improve with the shape and/or size. Thus, not only it is enabled to design the actuator with a sufficient stroke, but also it is possible to align the center of the magnetic head slider 13 and the load point or dimple position with the center of the actuator 11 resulting in the flying performance of the magnetic head slider 13 to be extremely stabilized. Because the three-layered plate member can be precisely machined, accuracy in size of the actuator 11 itself can be greatly improved.

Furthermore, since the actuator 11 in this embodiment holds the magnetic head slider 13 such that the slider 13 is mounted in a space between the movable arms 32 and 33, the thickness of the HGA around the magnetic head slider does not increase even if the actuator 11 is attached. Thus, no modifications in size of the magnetic disk drive apparatus due to the mounting of the actuator is necessary.

In addition, since the magnetic head slider 13 is caught in between the movable arms 32 and 33, the top end sections of the movable arms 32 and 33, which actually transfer the displacement to the slider 13, can be extended to always position at the top end of the slider 13. Thus, it is possible to provide a constant travel to the slider even if the size of the magnetic head slider 13 changes, and therefore an enough stroke of the magnetic head at the precise positioning operation can always be obtained.

As aforementioned, the spring plate section or the load adjustment mechanism 12 is configured, as a portion of the actuator 11, in a single layer structure of only the first stainless steel thin plate 17a protruded from the base section 30, and thus has a resilience.

The spring plate section 12 is formed to locate directly underneath the dimple 15a namely the load point. When the dimple 15a depresses this resilient spring plate section 12 as shown in FIG. 6, this spring plate section 12 becomes deformed and forces back. Thus, the load applied to the magnetic head slider 13 is determined to a value when the both forces are balanced.

In this embodiment, the spring plate section 12 formed directly underneath the dimple 15a provides load adjustment functions. By adjusting a width, a thickness and a length of the spring plate section 12, a desired load with respect to a given Z-height is obtained. The spring plate section 12 is bent when depressed by the dimple 15a. Thus, it is necessary to form a gap G shown in FIG. 6 for avoiding abutment of the top end of the spring plate section 12 to the magnetic head slider 13. This gap G is provided in this embodiment by the total thickness of the resin layer 17b and the second stainless steel thin plate 17c.

The actuator 11 and the load adjustment section 12 with such structure are fabricated by etching a three-layered plate member or sheet from both sides to selectively and simultaneously remove a partial region of the first stainless steel thin plate 17a, a partial region of the resin layer 17b and a partial region of the second stainless steel thin plate 17c over their full thickness.

The stainless steel plate may be etched using an acid such as $FeCl_3$ (ferric chloride). Such acid selectively etches only the stainless steel plate but does not etch the polyimide layer at all. Thus, the polyimide resin layer 17b operates as a stop layer and therefore within an etched region the first stainless steel thin plate 17a and the second stainless steel thin plate 17c are completely removed over the whole thickness. Accordingly, it is possible to easily control the etched depth at to a constant.

The polyimide resin layer 17b may be etched by wet etching using an alkali such as KOH (potassium hydroxide) or by dry etching using for example $O_2$ plasma or CF4 plasma. Such wet or dry etching selectively etches only the polyimide layer but does not etch the stainless steel plate at all. Thus, the first stainless steel thin plate 17a and the second stainless steel thin plate 17c operate as stop layers and therefore within an etched region only the polyimide resin layer 17b is completely removed.

The electrical conductor member consisting of trace conductors connected to the piezoelectric elements of the actuator 11 and trace conductors connected to the magnetic head element of the magnetic head slider 13 may be configured by a flexible conductor member with the trace conductors, directly formed on the flexure 16, or by a preliminarily fabricated flexible conductor sheet with the trace conductors, adhered on the flexure 16.

As mentioned above, according to this embodiment, the load beam 15 of the suspension has no bending section for imposing a load but is formed by a plane plate member with a sufficient stiffness to keep the Z-height. Thus, the suspension is unaffected by the resonance characteristics of the low-stiffness bending section of the conventional load beam. As a result, all resonance frequencies of the suspension in a sway mode (oscillation mode toward lateral directions of the suspension), a torsion mode (twisting mode around the longitudinal axis of the suspension) and a bending mode (oscillation mode toward up-and down directions of the suspension) of the load beam can be increased. These sufficient high resonance frequencies of the suspension can provide a high speed seek operation of the servo.

Also, according to the embodiment, since the load beam 15 of the suspension has no bending section for imposing a load, it is possible to provide a high stiffness to the load beam which has a large side sectional area and receives side winds. Thus, non-linear movement of the HGA due to the side winds produced by extremely high rotations of the magnetic disk can be suppressed to the minimum extent.

Furthermore, according to the embodiment, since the load beam 15 has no bending section for imposing a load but has a high stiffness as a whole, bending of a top end of the HGA towards the up-and-down directions can be suppressed at a minimum even when a Z-direction impact is applied to the HGA resulting in extremely improved shock resistance of the HGA. Therefore, various shock countermeasure mechanisms adopted in recent HGAs such as a limiter mechanism for limiting a moving amount of the flexure and a ramp loading mechanism for separating the HGA from the magnetic-disk surface at the time of non-operation for example can be omitted. Thus, the number of components of the HGA can be reduced resulting in a lower manufacturing cost of the HGA.

A value of applied load to the magnetic head slider 13 is determined from the Z-height and from shape and size of the spring plate section or load adjustment mechanism 12. As the spring plate section 12 is formed by executing photo-processes without performing bending of the load beam, the load value can be precisely adjusted with no variation. Therefore, even if the magnetic head slider becomes light in weight and thus a nominal value of the load is lowered, a desired load value applied to the magnetic head slider can be expected with a high accuracy and a small tolerance.

Since the load beam 15 is formed by a single plate member, the number of components of the HGA reduces and the number of the fixing positions reduces. Thus, the manufacturing process is simplified, the manufacturing cost is reduced and also the yield is enhanced. In addition, since it is not necessary to strictly adjust a bending angle of a bending section for imposing a load, the manufacturing process is further simplified, the manufacturing cost is reduced and also the yield is improved.

The suspension in this embodiment has a simple structure of the load beam and the load imposing section, and thus simulation of its characteristics can be very easily and precisely achieved.

Although in this embodiment the actuator ills formed by a three-layered plate member, the actuator according to the present invention can be formed by a multilayer plate member with four or more layers. The movable arms of the actuator are not limited to the three-layered structure as in this embodiment, but may be formed in a single layer or two-layered structure in accordance with desired characteristics. In case the actuator is formed by the multilayer structure with four or more layers, the movable arms of the actuator may be formed in a four or more-layered structure in accordance with desired characteristics. The load adjustment mechanism of the actuator is not limited to the single layer structure as in this embodiment, but may be formed in a two or more-layered structure in accordance with desired characteristics.

Figure 7:
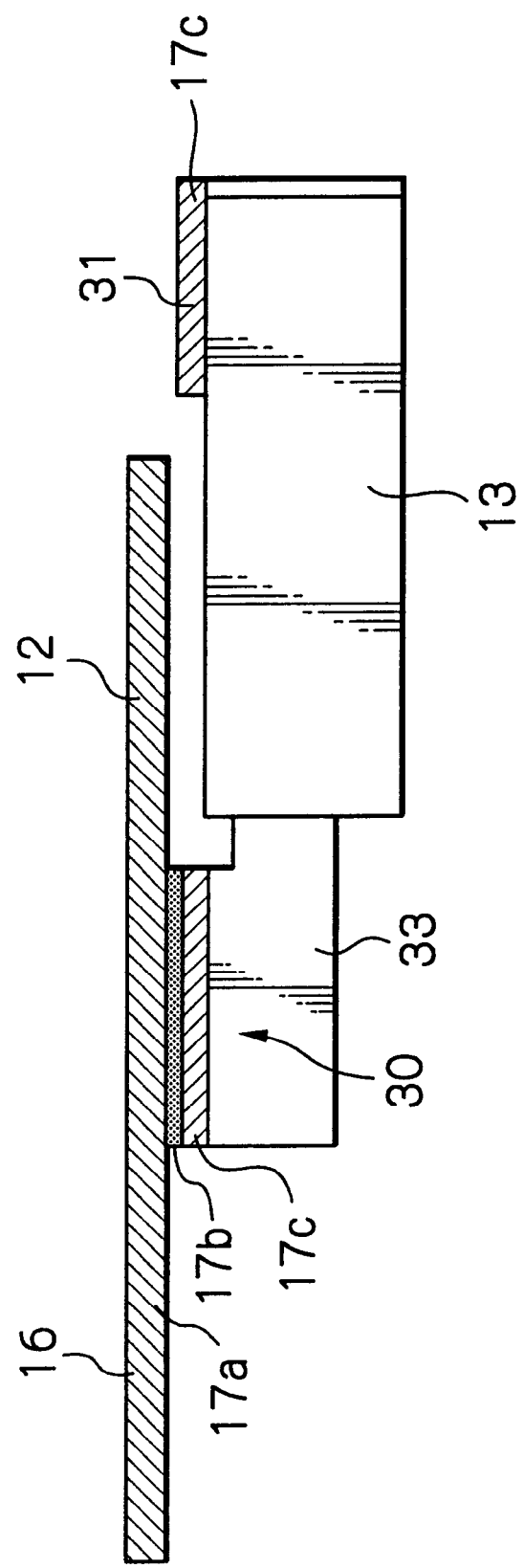
FIG. 7 is a sectional view corresponding to the A—A line sectional view, illustrating an actuator in another embodiment according to the present invention.

FIG. 7 shows a sectional view corresponding to the A—A line sectional view, illustrating an actuator in another embodiment according to the present invention.

In this embodiment, the actuator provided with a load adjustment mechanism and a flexure are unitarily formed. More concretely, the load adjustment mechanism 12 of the actuator 11 and the flexure 16 are formed by the first stainless steel thin plate 17a of the three-layered structure plate member.

Other configurations in this embodiment are the same as those in the embodiment of FIG. 1 and thus description thereof is omitted. Also, in FIG. 7 of this embodiment, the similar elements as those in the embodiment of FIG. 1 are represented by the same reference numerals.

Since the actuator and the flexure are unitarily formed, no fixing process of the actuator with the flexure is necessary resulting in simplifying of a manufacturing process of the HGA and reducing of manufacturing cost. Also, no consideration with respect to the fixing strength between the actuator and the flexure is necessary, and reliability of the fabricated HGA is improved.

Operations, advantages and modifications in this embodiment are the same as those in the embodiment of FIG. 1.

Figure 8:
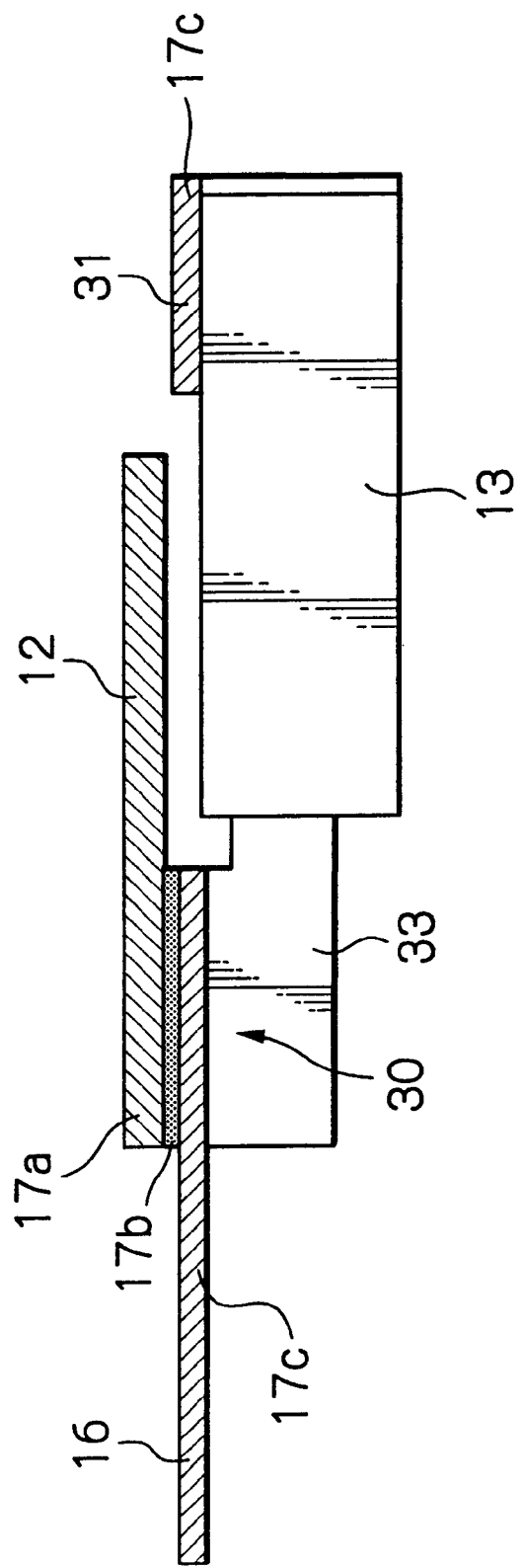
FIG. 8 is a sectional view corresponding to the A—A line sectional view, illustrating an actuator in a further embodiment according to the present invention.

FIG. 8 shows a sectional view corresponding to the A—A line sectional view, illustrating an actuator in a further embodiment according to the present invention.

In this embodiment, the actuator provided with a load adjustment mechanism and a flexure are unitarily formed as well as in the embodiment of FIG. 7. However, in this embodiment, the load adjustment mechanism 12 of the actuator 11 is formed by the first stainless steel thin plate 17a of the three-layered structure plate member and the flexure 16 is formed by the second stainless steel thin plate 17c of the three-layered structure plate member.

Other configurations in this embodiment are the same as those in the embodiment of FIG. 1 and thus description thereof is omitted. Also, in FIG. 8 of this embodiment, the similar elements as those in the embodiment of FIG. 1 are represented by the same reference numerals.

Since the actuator and the flexure are unitarily formed, no fixing process of the actuator with the flexure is necessary resulting in simplifying of a manufacturing process of the HGA and reducing of manufacturing cost. Also, no consideration with respect to the fixing strength between the actuator and the flexure is necessary, and reliability of the fabricated HGA is improved.

Operations, advantages and modifications in this embodiment are the same as those in the embodiment of FIG. 1.

Figure 9:
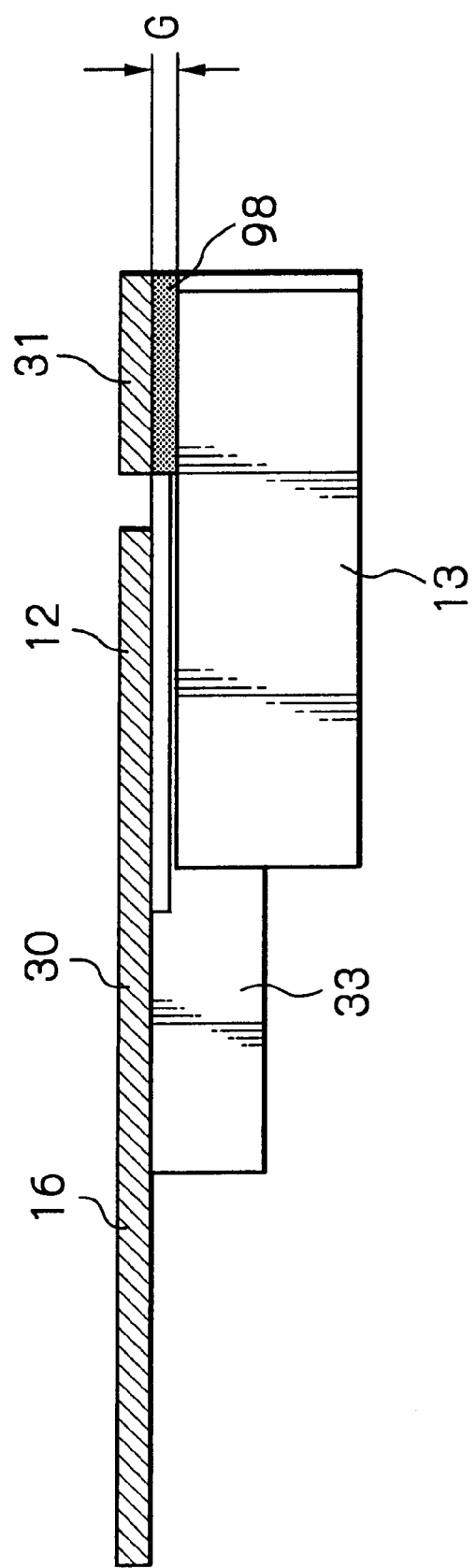
FIG. 9 is a sectional view corresponding to the A—A line sectional view, illustrating an actuator in a still further embodiment according to the present invention.

FIG. 9 shows a sectional view corresponding to the A—A line sectional view, illustrating an actuator in a still further embodiment according to the present invention.

In this embodiment, the actuator provided with a load adjustment mechanism and a flexure are unitarily formed as well as in the embodiment of FIG. 7. However, in this embodiment, the load adjustment mechanism 12 of the actuator 11 and the flexure 16 are formed by a single layer metal plate member such as a stainless steel plate, and a spacer 98 is inserted between the coupling section 31 of the actuator 11 and the magnetic head slider 13.

Other configurations in this embodiment are the same as those in the embodiment of FIG. 1 and thus description thereof is omitted. Also, in FIG. 9 of this embodiment, the similar elements as those in the embodiment of FIG. 1 are represented by the same reference numerals.

As the load adjustment mechanism 12 is bent when a load is imposed from the dimple 15a, it is necessary to form a gap G for avoiding abutment of the top end of the mechanism 12 to the magnetic head slider 13. This gap G is provided in this embodiment by the thickness of the spacer 98.

Since the actuator and the flexure are unitarily formed, no fixing process of the actuator with the flexure is necessary resulting in simplifying of a manufacturing process of the HGA and reducing of manufacturing cost. Also, no consideration with respect to the fixing strength between the actuator and the flexure is necessary, and reliability of the fabricated HGA is improved.

Operations, advantages and modifications in this embodiment are the same as those in the embodiment of FIG. 1.

Figure 10:
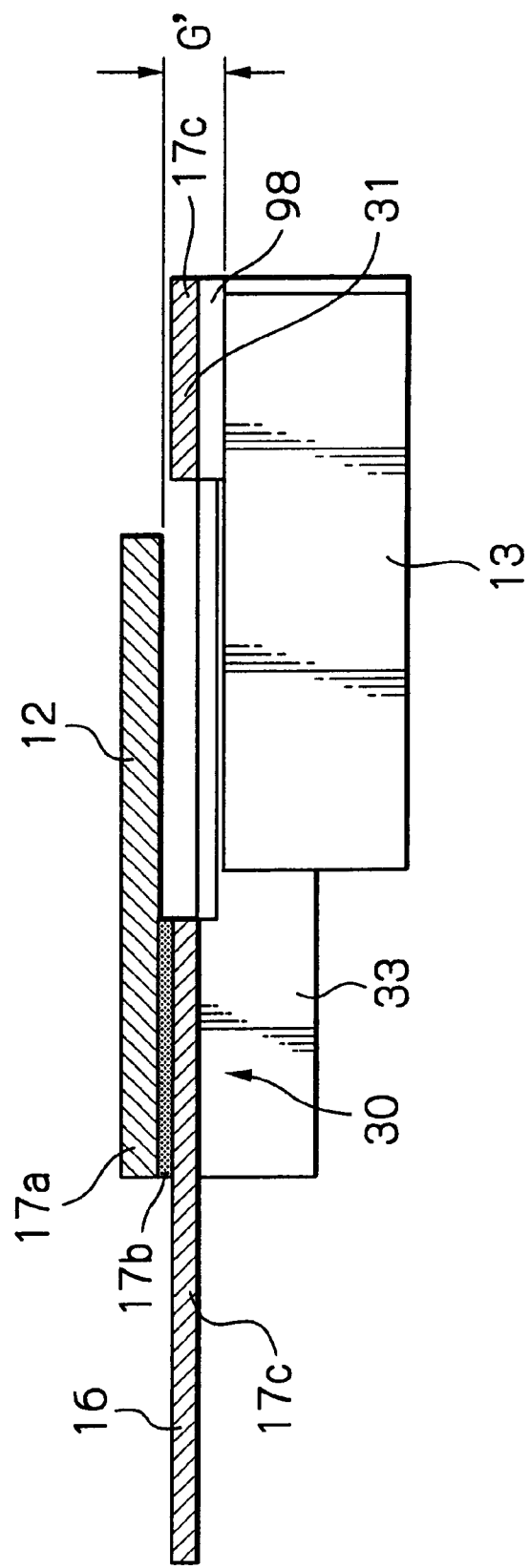
FIG. 10 is a sectional view corresponding to the A—A line sectional view, illustrating an actuator in a further embodiment according to the present invention.

FIG. 10 shows a sectional view corresponding to the A—A line sectional view, illustrating an actuator in a further emit according to the present invention.

In this embodiment, the actuator provided with a load adjustment mechanism and a flexure are unitarily formed as well as in the embodiment of FIG. 7. However, in this embodiment, the load adjustment mechanism 12 of the actuator 11 is formed by the first stainless steel thin plate 17a of the three-layered structure plate member and the flexure 16 is formed by the second stainless steel thin plate 17c of the three-layered structure plate member. Furthermore, in this embodiment, a spacer 98 is inserted between the coupling section 31 of the actuator 11 and the magnetic head slider 13.

Other configurations in this embodiment are the same as those in the embodiment of FIG. 1 and thus description thereof is omitted. Also, in FIG. 10 of this embodiment, the similar elements as those in the embodiment of FIG. 1 are represented by the same reference numerals.

By additionally inserting the spacer 98 in this embodiment, a larger gap G' is provided by the total thickness of the resin layer 17b, the second stainless steel thin plate 17b and the spacer 98.

Since the actuator and the flexure are unitarily formed, no fixing process of the actuator with the flexure is necessary resulting in simplifying of a manufacturing process of the HGA and reducing of manufacturing cost. Also, no consideration with respect to the fixing strength between the actuator and the flexure is necessary, and reliability of the fabricated HGA is improved.

Operations, advantages and modifications in this embodiment are the same as those in the embodiment of FIG. 1.

Figure 11:
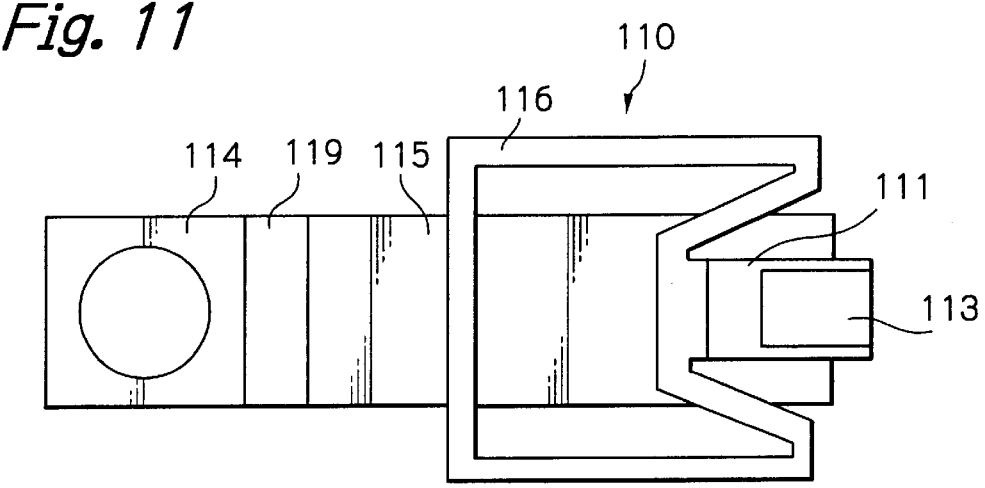
FIG. 11 is a plane view schematically illustrating the whole structure of an HGA in a still further embodiment according to the present invention.
Figure 12A:
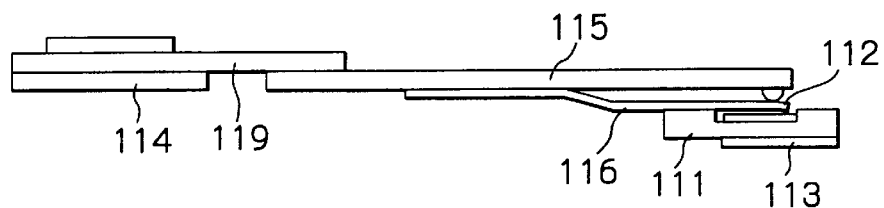
FIGS. 12a to 12d are side views illustrating various modifications of the HGA in the embodiment of FIG. 11.
Figure 12B:
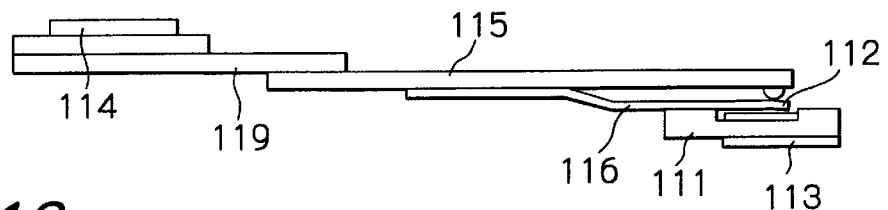
Figure 12C:
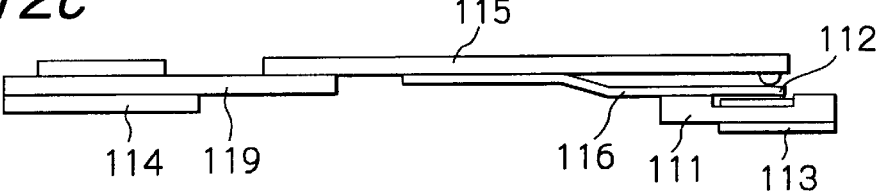
Figure 12D:
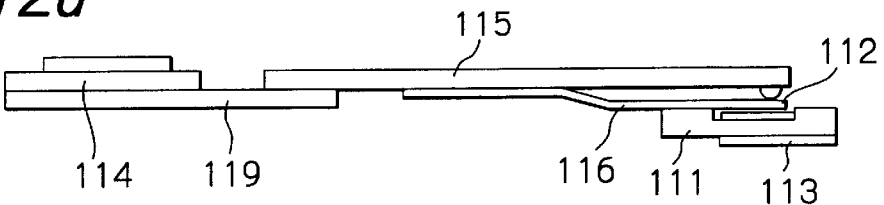

FIG. 11 schematically illustrates the whole structure of an HGA in a still further embodiment according to the present invention, and FIGS. 12a to 12d illustrate various modifications of the HGA in the embodiment of FIG. 11.

At the tam of inserting an HGA between magnetic disks in an HDD, it is necessary that a part of a suspension of the HGA can be backwardly bent. In order to provide this back-bending function to the HGA, a width of a load beam may be partially narrowed, or a load beam 115 and a base plate 114 may be coupled by a resilient coupling member 119 as this embodiment of FIG. 11.

As shown in FIG. 11, in this embodiment, a suspension 110 is configured by the base plate 114, the load beam 115 formed by a plane plate member, the resilient coupling member 119 for coupling a rear end section of the load beam 115 to the base plate 114, a flexure 116 fixed to and supported by the load beam 115, and an actuator 111 unitarily formed with this flexure 116 and provided with a load adjustment mechanism 112. The HGA is completed by fixing a magnetic head slider 113 with at least one magnetic head element to the actuator 111, and by electrically connecting trace conductors (not shown) to the actuator 111 and to the magnetic head element.

The coupling member 119 that is additionally formed so as to provide the back-bending function utilized at the tire of mounting this HGA to the HDD has a higher stiffness than the conventional bending section for adjusting a load imposed on the magnetic head slider, and also the load beam 115 has no such bending section for adjusting a load imposed on the magnetic head slider 113. Therefore, even if the HGA is back bent at the time of assembling the HGA into the HDD, the load imposed on the magnetic head slider will not changed after the assembling.

Other configurations except for the base plate 114 and the coupling member 119, operations, advantages and modifications in this embodiment are the same as those in the aforementioned embodiments.

Various modifications for coupling the base plate 114 and the load beam 115 by means of the coupling member 119 may be designed. Several examples thereof are illustrated in FIGS. 12a to 12d. The configurations of these examples will be apparent from these figures without explanation.

A structure of the HGA according to the present invention is not limited to the aforementioned structure. Furthermore, although it is not shown, a head drive IC chip may be mounted on a middle of the suspension.

In the aforementioned embodiments, the precise positioning actuators for the thin-film magnetic head elements and the HGAs with the actuators are described. However, it is apparent that the present invention can be applied to a precise positioning actuator for a head element such as an optical head element other than the thin-film magnetic head element and an HGA with the actuator.

Many widely different embodiments of the present invention may be constructed without departing from the spirit and scope of the present invention. It should be understood that the present invention is not limited to the specific embodiments described in the specification, except as defined in the appended claims.

What is claimed is:

1. A head gimbal assembly comprising:
   a head slider provided with at least one head element;
   a load beam;
   a flexure fixed to said load beam for determining a flying attitude of said head slider;
   a precise positioning actuator fixed to said head slider and supported by said flexure, for precisely positioning said at least one head element; and
   a load adjustment means formed with said actuator, for adjusting a load imposed on said head slider.

2. The head gimbal assembly as claimed in claim 1, wherein said load adjustment means is formed directly underneath a load point onto said head slider.

3. The head gimbal assembly as claimed in claim 2, wherein a projection formed on said load beam functions as said load point.

4. The head gimbal assembly as claimed in claim 1, wherein said load adjusting means comprises a spring plate section for controlling the load imposed on said head slider, one end of said load adjusting means being a free end.

5. The head gimbal assembly as claimed in claim 4, wherein said actuator is formed from a multilayer plate member.

6. The head gimbal assembly as claimed in claim 5, wherein said multilayer plate member comprises a first thin metal plate layer, a resin layer laminated on said first thin metal plate layer and a second thin metal plate layer laminated on said resin layer, and wherein said spring plate section is formed by a part of said first or second thin metal plate layer.

7. The head gimbal assembly as claimed in claim 4, wherein said actuator is formed from a single-layer metal plate member.

8. The head gimbal assembly as claimed in claim 7, wherein said load adjustment means comprises said single-layer metal plate member and a spacer laminated on said single-layer metal plate member, and wherein said spring plate section is formed by a part of said single-layer metal plate member.

9. The head gimbal assembly as claimed in claim 1, wherein said actuator is unitarily formed with said flexure.

10. The head gimbal assembly as claimed in claim 1, wherein said actuator is individually formed from said flexure.

11. The head gimbal assembly as claimed in claim 1, wherein said load beam is a straight shaped load beam to have a high stiffness.

12. The head gimbal assembly as claimed in claim 11, wherein said load beam consists of a single plate member.

13. The head gimbal assembly as claimed in claim 1, wherein said head gimbal assembly further comprises a back-bending section capable of bending a part of the head gimbal assembly at the time of mounting of the head gimbal assembly to a magnetic disk drive apparatus.

14. The head gimbal assembly as claimed in claim 1, wherein said actuator comprises a pair of movable arms each formed by a multilayer plate member or a single-layer metal plate member that is substantially in parallel with a side surface of said head slider, top end sections of said pair of movable arms being capable of displacing in response to a drive signal applied to said actuator along directions crossing a plane of said multilayer plate member or said single-layer metal plate member, and a coupling section connected between said top end sections of said pair of movable arms and formed by a multilayer plate member or a single-layer metal plate member that is substantially in parallel with a one surface of said head slider, said one surface being opposite to an air bearing surface of said head slider, and wherein said one surface of said head slider is fixed to said coupling section.

15. The head gimbal assembly as claimed in claim 14, wherein said actuator further comprises a base section formed by a multilayer plate member or a single-layer metal plate member that is in parallel with said coupling section, wherein said base section is fixed to or united with said flexure, and wherein said pair of movable arms extend forward from said base section.

16. The head gimbal assembly as claimed in claim 15, wherein said pair of movable arms, said coupling section and said base section of said actuator have a U-shaped section structure formed by bending a multilayer plate member or a single-layer metal plate member.

17. The head gimbal assembly as claimed in claim 14, wherein each of said pair of movable arms of said actuator comprises an arm member formed by a multilayer plate member or a single-layer metal plate member, and a piezoelectric element formed or adhered on a side surface of said arm member.

18. The head gimbal assembly as claimed in claim 17, wherein said piezoelectric element has a multilayer structure of piezoelectric material layers and of electrode layers.

19. The head gimbal assembly as claimed in claim 17, wherein said piezoelectric element has a single-layer structure of a piezoelectric material layer and of an electrode layer.

20. The head gimbal assembly as claimed in claim 1, wherein said coupling section of said actuator is fixed to said head slider by an adhesive.

21. The head gimbal assembly as claimed in claim 1, wherein said at least one head element is at least one thin-film magnetic head element.

* * * * *